C. P. SESTER & H. OELKERS.
GEARING.
APPLICATION FILED MAY 9, 1908.
959,622.
Patented May 31, 1910.
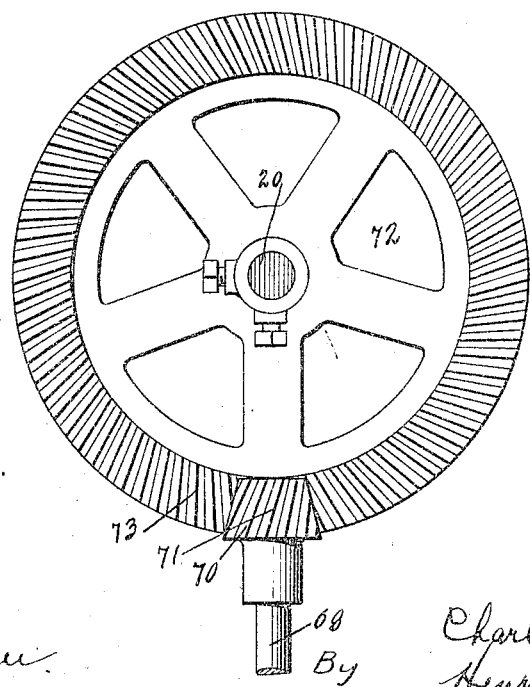

UNITED STATES PATENT OFFICE.

CHARLES P. SESTER AND HENRY OELKERS, OF PEORIA, ILLINOIS.

GEARING.

959,622.	Specification of Letters Patent.	Patented May 31, 1910.

Application filed May 9, 1908. Serial No. 431,826.

*To all whom it may concern:*

Be it known that we, CHARLES P. SESTER and HENRY OELKERS, citizens of the United States, residing at Peoria, in the county of Peoria and State of Illinois, have invented certain new and useful Improvements in Gearing, of which the following is a specification.

The object of this invention is to provide a peculiar gearing which is especially adapted for use in seeding machines.

The purpose for which this invention is particularly intended is to reduce the noise in a machine of this type and also to increase the efficiency of power transmission between driving shafts and distributer shafts. The gears are so constructed that their teeth mesh perfectly, thereby obviating a large amount of friction and thus insuring the least possible noise and wear during their operation.

For a further and fuller description of the invention disclosed, reference is to be had to the following specification and the drawing hereto attached.

The figure is an elevation or face view of a skew beveled gear and a beveled pinion adapted to mesh therewith.

The driving connections between the driving and driven, or distributer shafts, of a broadcast seeder are a constant source of annoyance and expense, and to overcome this we have adopted gears and pinions having skew teeth, that is, having the teeth placed obliquely across the beveled face of the gear wheel, and having teeth on the pinion which are arranged to mesh perfectly with the teeth carried upon the beveled gear wheel. The driving and driven shafts are disposed at right angles to each other and their axes intersect. The teeth on the skew gear are straight and their axes are coincident with tangents drawn to a circle circumscribed about the driving shaft. Therefore the axes of the teeth on the beveled skew gear do not intersect the shaft upon which the gear is carried. The beveled pinion which is adapted to mesh with the skew gear, carries teeth arranged upon its conical surface in such manner as to properly engage the straight teeth on the skew gear at the pitch line of the teeth on the gear.

Referring particularly to the figure in the drawing, the skew gear 72 is carried upon the driving shaft 20, and the axes of the teeth 73 are lines which lie tangent to a circle circumscribed about the shaft 20. The driven shaft 68 carries a pinion 70, which is fixedly mounted upon said shaft. The skew teeth 71, on the pinion 70, have faces on which straight lines might be drawn from end to end of each tooth, and are arranged to be constantly in mesh with the straight teeth 73 on the skew gear 72. The axes of the shafts 88 and 20 intersect at right angles.

In the economical use of gears, it is necessary that the driving teeth contact perfectly when the gears are in operation. The teeth of the skew gears maintain a better contact than that of the ordinary beveled gear, and therefore skew gears are often employed when economical transmission is desired, and also when it is desirable to reduce the noise which is usually attendant to the running of gears. The objection to skew gears however, is the fact that heretofore the teeth have been of spiral formation and therefore much harder to cut than a gear in which straight teeth are employed. In our device we have arranged both the teeth of the pinion and the skew gear in such manner that their faces comprise surfaces upon which straight lines may be drawn from one end of the teeth to the other, thus making it possible to cut or grind these gears in a manner similar to that of the ordinary beveled gear and pinion. At the same time, because of the fact that the teeth are skewed, we are enabled to secure the advantages of the skew teeth beveled gear, and because of the fact that the teeth are straight line teeth, we are enabled to obtain a better driving contact than where the tooth is curved.

Having thus described our invention what we desire to claim is as follows:—

1. In a machine of the class described in combination, a driving shaft, a driven shaft, the axes of said shafts intersecting, a gear wheel on said driving shaft, said gear wheel having straight teeth the axes of which are angular with respect to the radii of said gear wheel, and a pinion having teeth in mesh with said gear teeth.

2. In a machine of the class described in combination, a driving shaft, a driven shaft whose axis intersects the axis of said driving shaft, a gear wheel on said driving shaft, said gear wheel being provided with teeth having their axes co-incident with tangents drawn from a circle circumscribed about said driving shaft, and a pinion on said driven shaft having teeth engaging the teeth of said gear.

3. In a device of the class described in combination, a driving shaft, a driven shaft, the axes of said shafts intersecting, a gear wheel on said driving shaft, said gear wheel having teeth that are tangent to a circle circumscribed about said driving shaft, a pinion on said driven shaft, the teeth of said pinion being such that no two lie in the same plane.

4. In a device of the class described in combination, a driving shaft, a beveled gear wheel carried by said driving shaft, said gear wheel being provided with teeth having their axes at an angle to the radii of said gear wheel, a driven shaft whose axis intersects the axis of said driving shaft at right angles, a beveled pinion carried by said driven shaft, the teeth of said pinion being in mesh with the teeth of said gear constantly on the pitch line of said gear.

In testimony whereof we affix our signatures, in presence of two witnesses.

CHARLES P. SESTER.
HENRY OELKERS.

Witnesses:
 BELLE BUCK,
 EMILY O. NIEHAUS.